United States Patent [19]

Doi

[11] Patent Number: 4,640,183

[45] Date of Patent: Feb. 3, 1987

[54] AIR CONDITIONER

[75] Inventor: Koichi Doi, Atsugi, Japan

[73] Assignee: Nissan Motor Company, Limited, Kanagawa, Japan

[21] Appl. No.: 765,527

[22] Filed: Aug. 14, 1985

[30] Foreign Application Priority Data

Aug. 21, 1984 [JP] Japan .................................. 59-172401

[51] Int. Cl.[4] .......................... B60H 1/00; E04H 14/00
[52] U.S. Cl. ....................................... 98/2.01; 62/187; 165/43
[58] Field of Search ............................ 98/2.01; 165/43; 62/186, 187

[56] References Cited

U.S. PATENT DOCUMENTS

| 4,365,663 | 12/1982 | Inoue et al. | 165/43 |
| 4,382,463 | 5/1983 | Ikebukuro | 98/2.01 |
| 4,460,036 | 7/1984 | Yoshimi et al. | 98/2.01 |
| 4,463,801 | 8/1984 | Yoshimi et al. | 165/43 |
| 4,482,007 | 11/1984 | Yoshimi et al. | 165/43 |
| 4,540,040 | 9/1985 | Fukumoto et al. | 165/43 |

Primary Examiner—Ronald C. Capossela
Attorney, Agent, or Firm—Schwartz, Jeffery, Schwaab, Mack, Blumenthal & Evans

[57] ABSTRACT

A movable air mix door serves to adjust the temperature of outgoing air from an air conditioner. The temperature of outgoing air depends on the position of the air mix door. A combination of a position sensor for sensing the actual position of the air mix door and a temperature sensor for sensing the temperature of incoming air into the air conditioner generates a first signal depending on the actual position of the air mix door and on the incoming air temperature. A second signal represents a target position of the air mix door. The position of the air mix door is controlled by a controller in accordance with the first and second signals. Since the combination sensor produces a signal dependent on incoming air temperature, the processing load on the controller is reduced in that the controller itself need not correct the target position in accordance with the incoming air temperature.

5 Claims, 10 Drawing Figures

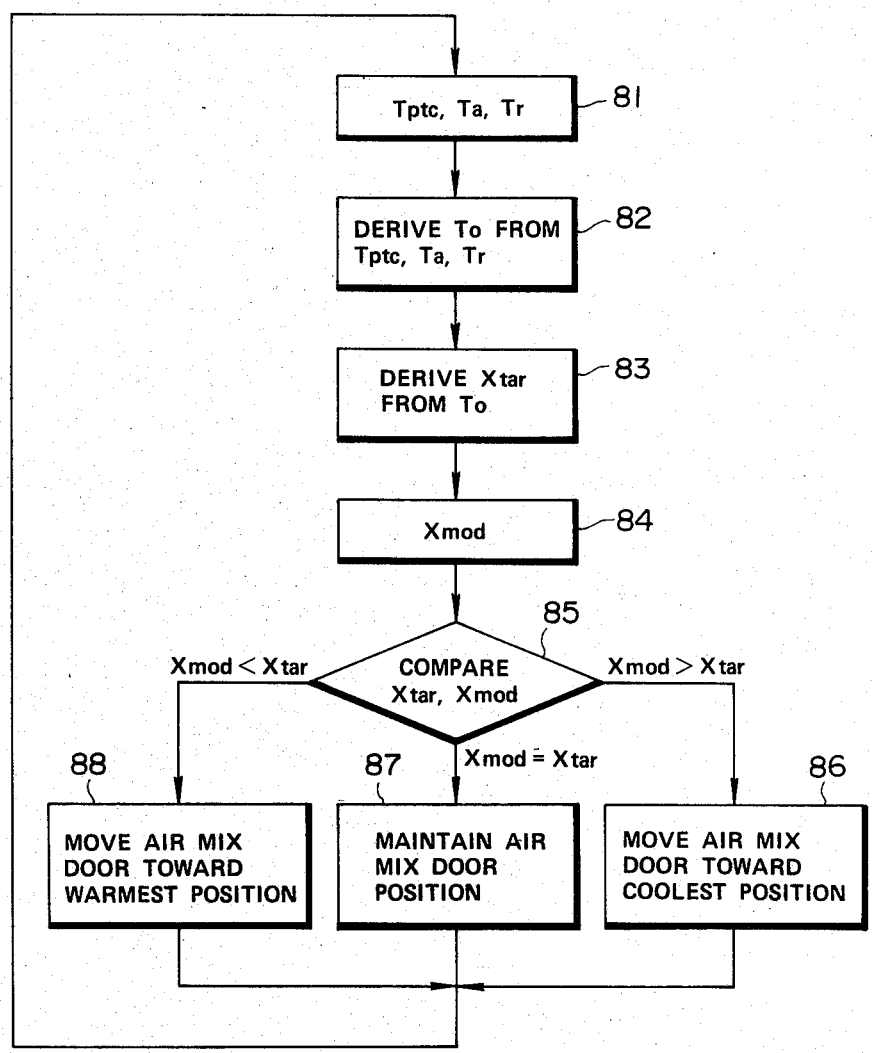

AIR CONDITIONER

BACKGROUND OF THE INVENTION

1. Field of the Invention

This invention relates to an air conditioner, such as a vehicular air conditioner.

2. Description of the Prior Art

Most vehicular air conditioners include an air mix door which adjustably determines the ratio between air flows passing through and bypassing a heating core. The temperature of air discharged from the air conditioner depends on the position of the air mix door. The position of the air mix door is controlled in accordance with a desired temperature within the vehicle passenger compartment.

Some advanced vehicular air conditioners include a temperature sensor residing at a point immediately downstream of a cooling evaporator. There are several preset patterns for control of the air mix door position. The control patterns are changed from one to another in accordance with the temperature signal from the sensor, in order to efficiently adjust the temperature within the vehicle passenger compartment. A microcomputer unit is used to select the control patterns and also to perform other control functions. Thus, the capacity of a memory in the microcomputer unit must be large enough to hold the control patterns.

SUMMARY OF THE INVENTION

It is an object of this invention to provide an air conditioner including a microcomputer unit performing fewer functions than is conventional.

Another object of this invention is to provide an air conditioner including a smaller memory than in conventional systems.

In accordance with this invention, an air conditioner includes a movable air mix door which serves to adjust the temperature of outgoing air from the air conditioner. The temperature of outgoing air depends on the position of the air mix door. The combination of a sensor monitoring the actual position of the air mix door and a sensor monitoring the temperature of incoming air into the air conditioner generates a first signal depending on the actual position of the air mix door and on the incoming air temperature. A second signal represents a target position of the air mix door. The position of the air mix door is controlled in accordance with the first and second signals.

BRIEF DESCRIPTION OF THE DRAWINGS

FIG. 7 is a flowchart of a program for operating the control unit of FIG. 6.

Like and corresponding elements are denoted by the same reference characters throughout the drawings.

DESCRIPTION OF THE FIRST PREFERRED EMBODIMENT

Figure 1:
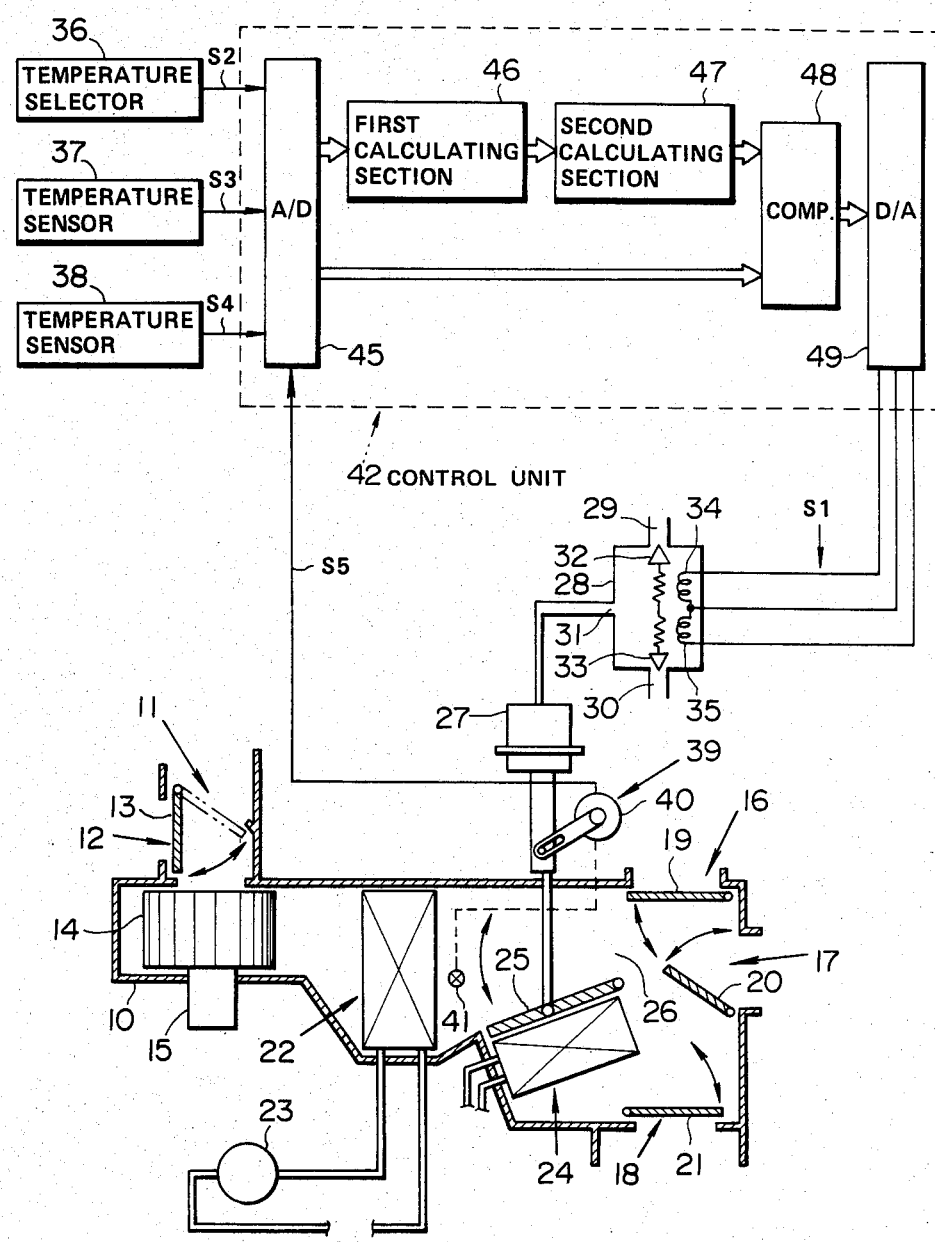
FIG. 1 is a diagram of an air conditioner according to a first embodiment of this invention.

With reference to FIG. 1, an air conditioner for a vehicle includes a duct 10 having two inlets 11 and 12 which lead from outside and inside the vehicle respectively. A pivotal intake door 13 disposed within the duct 10 selectively blocks and unblocks the inlets 11 and 12. A fan 14 disposed within the duct 10 downstream of the intake door 13 draws in air via the inlets 11 and 12. A motor 15 drives the fan 14. When the intake door 13 blocks the exterior inlet 11 and unblocks the interior inlet 12, air is drawn from the interior or the passenger compartment of the vehicle into the duct 10 via the interior inlet 12. When the intake door 13 unblocks the exterior inlet 11 and blocks the interior inlet 12, air is drawn from the exterior of the vehicle into the duct 10 via the exterior inlet 11.

The duct 10 has a defroster outlet 16, a vent outlet 17, and a floor outlet 18 downstream of the fan 14. Air driven by the fan 14 passes through the duct 10 and then exits from the duct 10 into the interior or the passenger compartment of the vehicle via the outlets 16, 17, and 18. Pivotal doors 19, 20, and 21 disposed within the duct 10 block and unblock the outlets 16, 17, and 18, respectively.

A cooling system includes an evaporator 22 disposed within the duct 10 downstream of the fan 14 but upstream of the outlets 16–18. Air driven by the fan 14 passes through the evaporator 22. When the cooling system is active, the evaporator 22 cools the air. When the cooling system is inactive, the evaporator 22 does not affect the air temperature.

The cooling system includes a compressor 23 coupled to a vehicular engine (not shown) via a clutch (not shown). When the clutch connects the compressor to the engine, the cooling system is activated. When the clutch disconnects the compressor 23 from the engine, the cooling system is deactivated.

A heating system includes a heater core or heat exchanger 24 disposed within the duct 10 downstream of the evaporator 22 but upstream of the outlets 16–18. The heater core has internal passages through which vehicular engine coolant flows. As air passes through the heater core 24, it is heated by the core 24.

An air mix door 25 disposed within the duct 10 downstream of the evaporator 22 but upstream of the outlets 16–18 can pivot between first and second limit positions. When the air mix door 25 is in its first limit position, it blocks the front face or inlet of the heater core 24 and unblocks a passage 26 bypassing the core 24. In this case, essentially all of air which has entered the duct 10 bypasses the heater core 24 and then exits from the duct 10 so that the heater core 24 does not affect the temperature of outgoing air. The first limit position is called the coolest position. When the air mix door 25 is in its second limit position, it unblocks the front face or inlet of the heater core 24 and blocks the bypass passage 26. In this case, essentially all of air flows through the heater core 24 so that the heater core 24 has a maximal effect on the temperature of outgoing air. The second limit position is called the warmest position. When the air mix door 25 is in a position intermediate between the two limit positions, it partially unblocks the front face or inlet of the heater core 24 and also partially unblocks the bypass passage 26. In this case, some of air flows through the heater core 24 and the rest of air bypasses the core 24 so that the core 24 has a moderate effect on the temperature of outgoing air. Thus, the air mix door 25 adjusts how much of air passes through or bypasses the heater core 24 in accordance with its position. As a result, the temperature of outgoing air depends on the position of the air mix door 25.

A power servo or pressure-responsive actuator 27 including a working chamber is linked to the air mix door 25. The position of the air mix door 25 depends on the pressure in the working chamber of the actuator 27.

A three-way solenoid valve 28 includes first and second inlets 29 and 30, and an outlet 31. The first inlet 29 opens to atmosphere. The second inlet 30 leads from a vacuum source (not shown), such as a vacuum tank connected via a check valve to a vehicular engine air intake passage (not shown) downstream of a throttle valve (not shown). The outlet 31 is connected to the working chamber of the actuator 27.

The solenoid valve 28 includes first and second valve members 32 and 33 actuated by respective electromagnets having control windings 34 and 35. When the first control winding 34 is electrically energized and de-energized, the first valve member 32 connects and disconnects the first inlet 29 to and from the outlet 31 respectively. When the second control winding 35 is electrically energized and de-energized, the second valve member 33 connects and disconnects the second inlet 30 to and from the outlet 31 respectively.

The windings 34 and 35 are controlled via a signal S1 which can preferably assume any one of three different states. When the control signal S1 assumes it first state, the outlet 31 is connected to the first inlet 29 and is disconnected from the second inlet 30, increasing the pressure in the working chamber of the actuator 27. When the control signal S1 assumes its second state, the outlet 31 is disconnected from the first inlet 29 and is connected to the second inlet 30, decreasing the pressure in the working chamber of the actuator 27. When the control signal S1 assumes its third state, the outlet 31 is disconnected from both the inlets 29 and 30, holding the pressure in the working chamber of the actuator 27 essentially constant. In this way, the pressure in the working chamber of the actuator 27 is adjusted via the control signal S1, so that the position of the air mix door 25 is also adjusted via the control signal S1.

Figure 2:
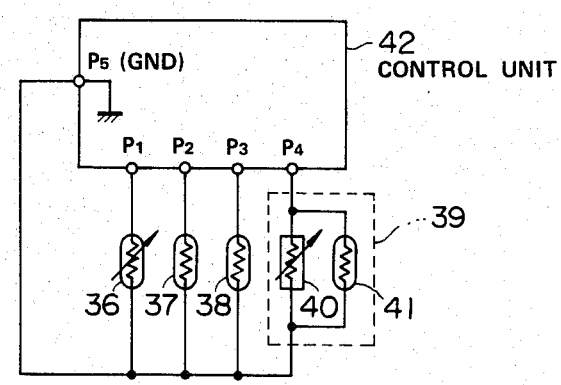
FIG. 2 is a schematic diagram of the connections between the control unit and the sensors of FIG. 1.

A temperature setting section or temperature selector 36 generates a signal S2 representing an adjustable target or desired value of the air temperature within the vehicle passenger compartment. As shown in FIG. 2, the temperature selector 36 includes a manually-operated variable resistor, the resistance of which depends on the desired air temperature.

A temperature sensor 37 generates a signal S3 representing the atmospheric temperature or the air temperature outside the vehicle. As shown in FIG. 2, the temperature sensor 37 includes a thermistor, the resistance of which depends on the atmospheric temperature.

A temperature sensor 38 generates a signal S4 representing the actual air temperature within the vehicle passenger compartment. As shown in FIG. 2, the temperature sensor 38 includes a thermistor, the resistance of which depends on the air temperature within the passenger compartment.

A combination sensor 39 including a position sensor 40 and a temperature sensor 41 generates a signal S5 depending on the actual position of the air mix door 25 and on the temperature of air at a point between the evaporator 22 and the air mix door 25.

As shown in FIGS. 1 and 2, the position sensor 40 includes a variable resistor mechanically connected to the linkage between the actuator 27 and the air mix door 25. The resistance of this variable resistor depends on the position of the air mix door 25. Specifically, the resistance of the variable resistor in the position sensor 40 increases as the air mix door 25 moves from the warmest position to the coolest position.

As shown in FIGS. 1 and 2, the temperature sensor 41 includes a thermistor disposed at a point within the duct 10 between the evaporator 22 and the air mix door 25. Accordingly, the resistance of this thermistor depends on the air temperature at this point. Specifically, the resistance of the thermistor in the temperature sensor 41 increases as the air temperature decreases. When the evaporator 22 is inactive, the air temperature represented by the thermistor of the sensor 41 is equal to the temperature of air drawn into the duct 10, that is, the temperature of incoming or intake air. The thermistor of the sensor 41 and the variable resistor of the position sensor 40 are electrically connected in parallel.

A control unit 42 is electrically connected to the elements 36, 37, 38, and 39 to receive the signals S2-S5. Specifically, the control unit 42 includes input ports P1-P5. The variable resistor of the temperature selector 36 is connected between the ports P1 and P5. The thermistor of the temperature sensor 37 is connected between the ports P2 and P5. The thermistor of the temperature sensor 38 is connected between the ports P3 and P5. The parallel combination of the variable resistor of the position sensor 40 and the thermistor of the temperature sensor 41 in the combination sensor 39 is connected between the ports P4 and P5. The port P5 is grounded.

The control unit 42 generates the control signal S1 in accordance with the signals S2-S5. The control signal S1 is outputted to the solenoid valve 28 via an electrical connection between the control unit 42 and the valve 28.

Figure 3:
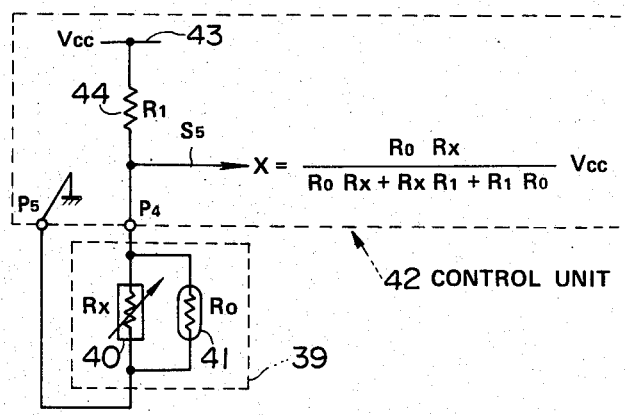
FIG. 3 is a schematic diagram of the combination sensor of FIG. 1.

As shown in FIG. 3, the control unit 42 includes a line 43 at a constant positive potential Vcc with respect to ground. The line 43 is connected to the port P4 via a fixed resistor 44. The signal S5 is a voltage X between the ports P4 and P5 which depends on the ratio between the resistance of the resistor 44 and the total resistance of the parallel combination of the variable resistor and the thermistor in the combination sensor 39. The signal voltage X is given by the following equation:

$$X = \frac{R0Rx}{R0Rx + RxR1 + R1R0} Vcc$$

where R0 is the resistance of the thermistor in the combination sensor 39, Rx is the resistance of the variable resistor in the combination sensor 39, and R1 is the resistance of the fixed resistor 44.

As the resistance of the variable resistor in the position sensor increases, that is, as the air mix door 25 moves toward its coolest position, the signal voltage X increases toward an asymptotic value Xo. The value Xo is given by the following equation:

$$Xo = \frac{R0}{R0 + R1} Vcc$$

The thermistor resistance R0 assumes three different values R0(1), R0(2), and R0(3) for three different incoming air temperatures Tin(1), Tin(2), and Tin(3). If Tin(1)<Tin(2)<Tin(3), R0(1)>R0(2)>R0(3).

Figure 4:
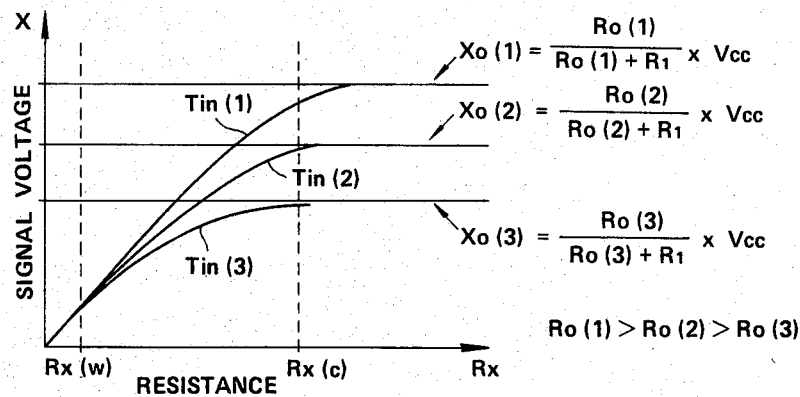
FIG. 4 is a graph of the relationship between signal voltage from the combination sensor and resistance of the variable resistor of the position sensor of FIG. 1 at three different incoming air temperatures.

As shown in FIG. 4, the asymptotic level Xo assumes three different values Xo(1), Xo(2), and Xo(3) for the respective incoming air temperatures Tin(1), Tin(2), and Tin(3). The values Xo(1), Xo(2), and Xo(3) are given by the following equations:

$$Xo(1) = \frac{R0(1)}{R0(1) + R1} Vcc$$

$$Xo(2) = \frac{R0(2)}{R0(2) + R1} Vcc$$

$$Xo(3) = \frac{R0(3)}{R0(3) + R1} Vcc$$

If Tin(1)<Tin(2)<Tin(3), Xo(1)>Xo(2)>Xo(3). In this way, as the incoming air temperature Tin decreases, the value Xo increases.

As the resistance Rx increases from the lower limit value Rx(W) to the upper limit value Rx(C), that is, as the air mix door 25 moves from the warmest position to the coolest position, the signal voltage X increases along a line specified by the incoming air temperature Tin. Provided that the air mix door 25 remains in a fixed position, the signal voltage X increases as the incoming temperature Tin decreases.

Returing to FIGS. 2 and 3, the input ports P1, P2, and P3 are connected via respective fixed resistors (not shown) to the line 43 at the potential Vcc. The signals S2, S3, and S4 are voltages at the ports P1, P2, and P3 respectively.

As shown in FIG. 1, the control unit 42 includes an analog-to-digital (A/D) convertor 45, first and second calculating sections 46 and 47, a comparator 48, and a digital-to-analog (D/A) convertor 49.

The A/D convertor 45 transforms the analog signals S2-S5 into corresponding digital signals, which are applied to the first calculating section 46 and the comparator 48.

The first calculating section 46 calculates a target or desired value To of temperature of outgoing air from the values of the desired air temperature within the vehicle passenger compartment, the atmospheric temperature, and the actual air temperature within the vehicle passenger compartment derived by the signals S2-S4. This calculation is performed by referring to the following equation:

$$To = ATptc + BTa + C(Tptc - Tr) + D$$

where Tptc is the value of the desired air temperature within the vehicle passenger compartment, Ta is the value of the atmospheric temperature, Tr is the value of the actual air temperature within the vehicle passenger compartment, and A, B, C, and D are preset constants.

Figure 5:
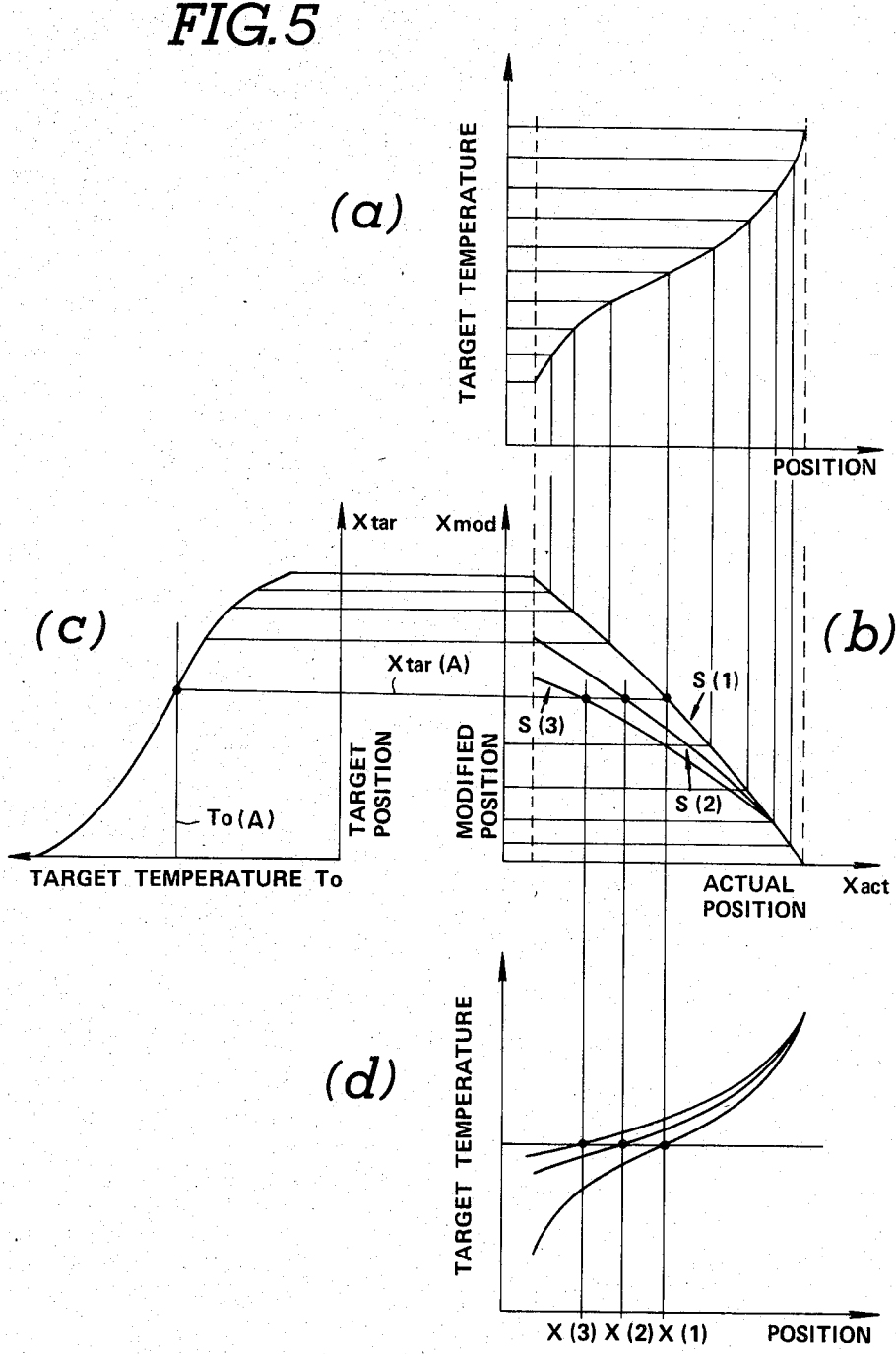
FIG. 5(a) is a graph of a control pattern of the air mix door position versus target outgoing air temperature in the air conditioner of FIG. 1.
FIG. 5(b) is a graph of the relationship between modified air mix door position and actual air mix door position in the air conditioner of FIG. 1 at three different incoming air temperatures.
FIG. 5(c) is a graph of the relationship between target outgoing air temperature and target air mix door position in the air conditioner of FIG. 1.
FIG. 5(d) is a graph of the relationship between controlled air mix door position and target outgoing air temperature in the air conditioner of FIG. 1.

The second calculating section 47 derives a target or desired position Xtar of the air mix door 25 from the target temperature To of outgoing air given by the first calculating section 46. The relationship between the target position Xtar of the air mix door 25 and the target temperature To of outgoing air is shown in FIG. 5(c). As the target temperature To increases, the target position Xtar moves toward a limit corresponding the warmest position of the air mix door 25.

The comparator 48 compares the air mix door target position value Xtar with a value Xmod derived from the signal S5. This value Xmod depends on the actual position of the air mix door 25 and the temperature of incoming air. Specifically, this value Xmod represents the air mix door actual position modified in accordance with the incoming air temperature.

FIG. 5(b) indicates the relationship between the modified air mix door position Xmod and the actual air mix door position Xact at different incoming air temperatures Tin(1), Tin(2), and Tin(3), where Tin(1)<Tin(2)<Tin(3). The curves S(1), S(2), and S(3) are specified by the air temperatures T(1), T(2), and T(3) respectively. It should be noted that the resistance of the variable resistor in the position sensor 40 increases as the air mix door 25 moves toward its coolest position.

The D/A convertor transforms a digital output signal from the comparator 48 into a corresponding analog signal, which is the control signal S1 applied to the solenoid valve 28.

The control signal S1 is designed so that the modified air mix door position Xmod will track or remain equal to the air mix door target position Xtar. It should be noted that the target air mix door position Xtar is derived from the target outgoing air temperature To. FIG. 5(a) shows a control pattern of the air mix door position versus the target outgoing air temperature.

It should be noted that the first and second calculating sections 46 and 47, and the comparator 48 may comprise a single microprocessing unit.

It is now assumed that the target outgoing air temperature To calculated in the first calculating section 46 is a certain value To(A). The second calculating section 47 derives the air mix door target position Xtar(A) from the target outgoing air temperature To(A) by referring to the relationship in FIG. 5(c).

When the incoming air temperature is the value Tin(1), the position of the air mix door 25 is adjusted to a point X(1) in accordance with the characteristic line S(1), as shown in FIGS. 5(b) and 5(d).

When the incoming air temperature is the value Tin(2), the position of the air mix door 25 is adjusted to a point X(2) in accordance with the characteristic line S(2) as shown in FIGS. 5(b) and 5(d). The point X(2) is closer to the coolest limit than the point X(1) is.

When the incoming air temperature is the value Tin(3), the position of the air mix door 25 is adjusted to a point X(3) in accordance with the characteristic line S(3) as shown in FIGS. 5(b) and 5(d). The point X(3) is closer to the coolest limit than the point X(2) is.

As is understood from FIGS. 5(b), 5(c), and 5(d), at the same target outgoing air temperature, the controlled position of the air mix door 25 moves toward its coolest position as the incoming air temperature increases. The combination sensor 39 provides the dependency of the controlled air mix door position on the incoming air temperature. This makes it unnecessary for the control unit 42 to perform additional functions to take incoming air temperature into account. Accordingly, the control unit 42 need execute fewer steps and a memory in the unit 42 can be of lower capacity than in conventional systems. Furthermore, the control system of this invention exhibits quicker response than conventional systems.

It should be noted that the temperature sensor 41 may reside at a position within the duct 10 upstream of the evaporator 22. In this case, the dependency of the target air mix door position Xtar on the target outgoing air temperature To which is given in the second calculating section 47 is modified in accordance with the adjusted location of the temperature sensor 41.

The variable resistor of the position sensor 40 and the thermistor of the temperature sensor 41 may be connected in series.

The thermistor of the temperature sensor 41 may be connected in parallel with the fixed resistor 44.

DESCRIPTION OF THE SECOND PREFERRED EMBODIMENT

Figure 6:
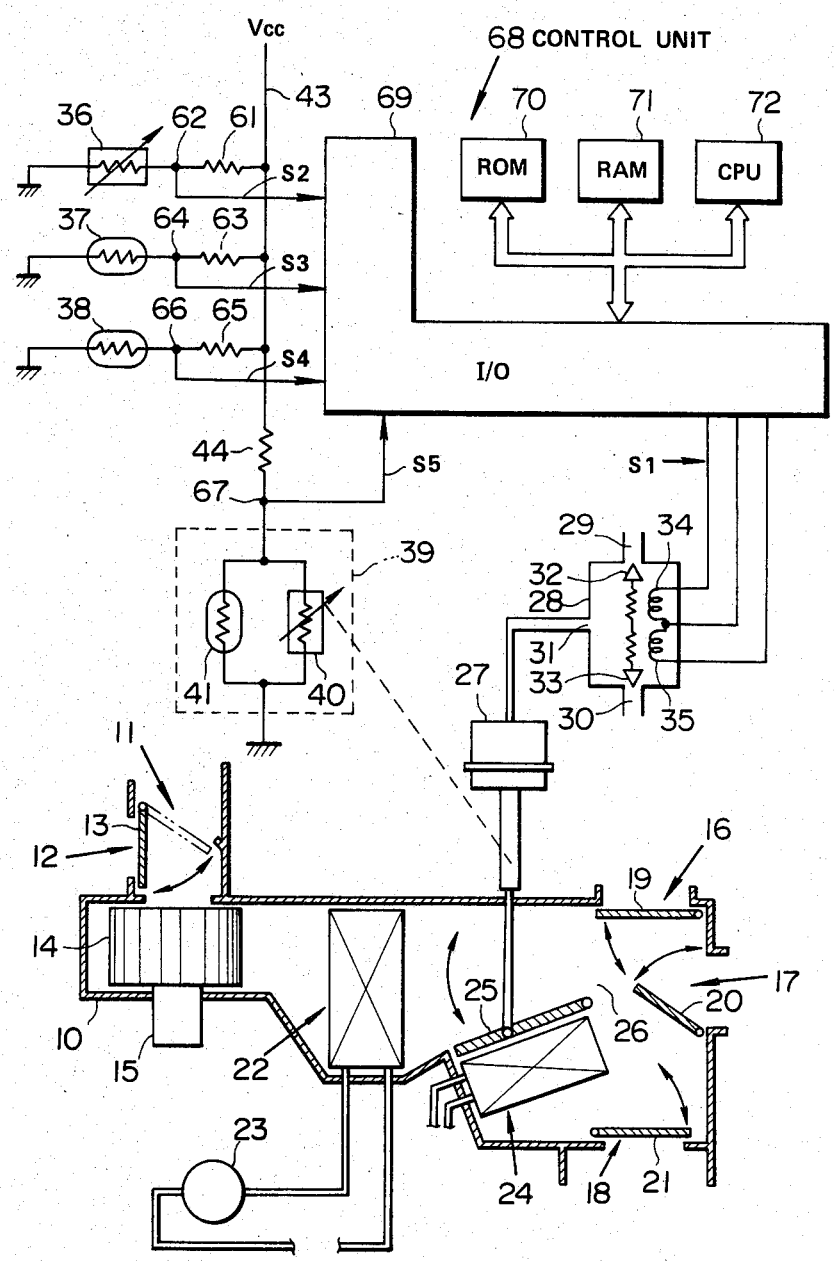
FIG. 6 is a diagram of an air conditioner according to a second embodiment of this invention.

With reference to FIG. 6, one terminal of the variable resistor of the temperature selector 36 is electrically connected via a fixed resistor 61 to the line 43 at the potential Vcc. The other terminal of this variable resistor is grounded. The signal S2 is a voltage at the junction 62 between the variable resistor and the fixed resistor 61.

One terminal of the thermistor of the temperature sensor 37 is electrically connected to the line 43 via a fixed resistor 63. The other terminal of this thermistor is grounded. The signal S3 is a voltage at the junction 64 between the thermistor and the fixed resistor 63.

One terminal of the thermistor of the temperature sensor 38 is electrically connected to the line 43 via a fixed resistor 65. The other terminal of this thermistor is grounded. The signal S4 is a voltage at the junction 66 between the thermistor and the fixed resistor 65.

The variable resistor of the position sensor 40 and the thermistor of the temperature sensor 41 are electrically connected in parallel to form the combination sensor 39 as in the embodiment of FIGS. 1-5. One terminal of the combination sensor 39 is connected to the line 43 via the fixed resistor 44. The signal S5 is a voltage at the junction 67 between the combination sensor 39 and the fixed resistor 44.

A control unit 68 includes the combination of an input/output (I/O) circuit 69, a read-only memory (ROM) 70, a random-access memory (RAM) 71, and a central processing unit (CPU) 72.

The I/O circuit 69 is electrically connected to the junctions 62, 64, 66, and 67 to receive the signals S2-S5. The I/O circuit 69 outputs the control signal S1 to the solenoid valve 28 via an electrical connection between the circuit 69 and the valve 28.

The control unit 68 operates in accordance with a program stored in the ROM 70. FIG. 7 is a flowchart of this program.

As illustrated in FIG. 7, in a first block 81 of the program, the current values of the desired air temperature within the vehicle passenger compartment, the atmospheric temperature, and the actual air temperature within the vehicle passenger compartment are derived from the signals S2-S4. In this program, the variables Tptc, Ta, and Tr represents the desired air temperature within the passenger compartment, the atmospheric temperature, and the actual air temperature within the passenger compartment.

In a block 82 following the block 81, a target value of outgoing air temperature is derived from the temperature values Tptc, Ta, and Tr given in the previous block 81. In this program, the variable To represents this target outgoing air temperature. The derivation of the target temperature To is performed by referring to the following equation:

$$To = ATptc + BTa + C(Tptc - Tr) + D$$

where A, B, C, and D are present constants.

In a block 83 following the block 82, a target position of the air mix door 25 is derived from the target outgoing air temperature To given in the previous block 82. In this program, the variable Xtar represents this target air mix door position. Specifically, the ROM 70 holds a table in which a set of values of target air mix door position are plotted as a function of target outgoing air temperature values. The derivation of the target air mix door position Xtar is performed by referring to this table.

In a block 84 following the block 83, the current value of the modified air mix door position is derived from the signal S5. In this program, the variable Xmod represents this modified air mix door position. The modified air mix door position Xmod depends on the actual air mix door position and on the incoming air temperature as in the embodiment of FIGS. 1-5.

In a block 85 following the block 84, the target air mix door position Xtar given in the previous block 83 and the modified air mix door position Xmod given in the preceding block 84 are compared. If the modified position Xmod deviates from the target position Xtar in the direction toward the warmest limit position of the air mix door 25, the program advances to a block 86. If the modified position Xmod coincides with the target position Xtar, the program advances to a block 87. If the modified position Xmod deviates from the target position Xtar in the direction toward the coolest limit position of the air mix door 25, the program advances to a block 88.

In the block 86, the control signal S1 is adjusted to move the air mix door 25 toward its coolest position. After the block 86, the program returns to the first block 81.

In the block 87, the control signal S1 is adjusted so as to hold the air mix door 25 where it is. After the block 87, the program returns to the first block 81.

In the block 88, the control signal S1 is adjusted to move the air mix door 25 toward its warmest position. After the block 88, the program returns to the first block 81.

As a result of the return to the first block 81, the program reiterates periodically. Therefore, the target air mix door position Xtar is updated in accordance with the desired air temperature within the vehicle passenger compartment, the atmospheric temperature, and the actual air temperature within the vehicle passenger compartment.

Execution of the blocks 85-88 causes the modified air mix door position Xmod to track or remain equal to the target air mix door position Xtar. Since the modified air mix door position Xmod depends on the actual position of the air mix door 25, the controlled position of the air mix door 25 depends on the target air mix door position Xtar. Since the modified air mix door position Xmod depends on the incoming air temperature, the controlled position of the air mix door 25 depends on the incoming air temperature as in the embodiment of FIGS. 1-5.

What is claimed is:

1. An air conditioner comprising:
   (a) a movable air mix door for adjusting the temperature of outgoing air from the air conditioner, the outgoing air temperature depending on the position of the air mix door;
   (b) a combination sensor formed of a position sensor for sensing actual position of the air mix door and a temperature sensor for sensing temperature of incoming air into the air conditioner, said combination sensor generating a first signal depending on the actual position of the air mix door and on the incoming air temperature;
   (c) means for generating a second signal representing a target position of the air mix door; and
   (d) means for controlling the position of the air mix door in accordance with the first and second signals.

2. The air conditioner of claim 1, wherein the position sensor includes a variable resistor, the resistance of which depends on the actual position of the air mix door, the temperature sensor includes a thermistor, the resistance of which depends on the temperature of incoming air, the variable resistor and the thermistor being connected in parallel, the parallel combination of the variable resistor and the thermistor generating the first signal.

3. The air conditioner of claim 2, further comprising a fixed resistor, the parallel combination of the variable resistor and the thermistor being connected via the fixed resistor to an electrical line held at a constant potential.

4. The air conditioner of claim 1, further comprising an evaporator residing upstream of the air mix door, the temperature sensor sensing the temperature of incoming air flowing between the evaporator and the air mix door.

5. An air conditioner comprising:
   (a) a movable air mix door for adjusting temperature of outgoing air from the air conditioner, the outgoing air temperature depending on the position of the air mix door; p1 (b) a combination sensor comprising a position sensor for sensing actual position of the air mix door and a temperature sensor for sensing temperature of incoming air into the air conditioner, said combination sensor generating a single combined signal depending on the sensed actual position of the air mix door and on the sensed incoming air temperature, wherein said combination sensor derives the combined signal by modifying the sensed actual position of the air mix door in accordance with the sensed incoming air temperature, the combined signal representing a temperature-modified position of the air mix door;
   (c) means for generating a target signal representing a target position of the air mix door; and
   (d) means for controlling the position of the air mix door in accordance with the combined and target signals so that the temperature-modified position of the air mix door follows the target position of the air mix door.

* * * * *